(12) United States Patent
Nakada

(10) Patent No.: US 6,544,572 B1
(45) Date of Patent: Apr. 8, 2003

(54) METHOD AND APPARATUS FOR SEVERING ROOTS AND LEAVES OF BEAN SPROUTS

(75) Inventor: Masahiro Nakada, Dixon, CA (US)

(73) Assignee: Salad Cosmo U.S.A. Corp., Dixon, CA (US)

(*) Notice: Subject to any disclaimer, the term of this patent is extended or adjusted under 35 U.S.C. 154(b) by 0 days.

(21) Appl. No.: 10/123,433

(22) Filed: Apr. 15, 2002

(51) Int. Cl.[7] .............................. A23L 1/00; A23N 15/00
(52) U.S. Cl. ..................... 426/506; 99/536; 99/635; 99/637; 99/643; 426/481; 426/518
(58) Field of Search ........................ 426/506, 507, 426/481, 518; 99/536, 635, 637, 643, 443 C

(56) References Cited

U.S. PATENT DOCUMENTS

| | | | | |
|---|---|---|---|---|
| 5,802,965 A | * | 9/1998 | Lin | 99/635 |
| 5,916,354 A | * | 6/1999 | Dragt | 99/536 |
| 6,125,745 A | * | 10/2000 | Kawakami | 99/635 |
| 6,346,288 B1 | | 2/2002 | Nakada | |

FOREIGN PATENT DOCUMENTS

JP   01-265830   10/1989

* cited by examiner

Primary Examiner—George C. Yeung
(74) Attorney, Agent, or Firm—Bernhard Kreten

(57) ABSTRACT

Bean sprouts conveyed on a conveyor are caused to fall into a number of cylindrical cases moved on an upper severing table so that the bean sprouts are enclosed in the respective cases in a standing state. Air is caused to blow from over the cylindrical cases by a blowing casing so that downward roots or leaves of the bean sprouts in the cylindrical cases are caused to fall into the severing slits. A first severing work is carried out in which the root or leaf of the bean sprout is held between a lower edge of the cylindrical case and an edge of the severing slit to be severed. A second severing work is then carried out in which the cylindrical cases are inverted upside down so that the bean sprouts in the cases are inverted upside down and so that the downward roots and leaves of the bean sprouts are severed by the lower severing table.

9 Claims, 4 Drawing Sheets

METHOD AND APPARATUS FOR SEVERING ROOTS AND LEAVES OF BEAN SPROUTS

BACKGROUND OF THE INVENTION

1. Field of the Invention

This invention relates to a method and apparatus for severing roots and leaves of bean sprouts.

2. Description of the Related Art

For example, a growing container of about 1×2×1.5 (-meters) is generally used in a growing method for mass-production of bean sprouts. A large quantity of seed is put into the growing container, and water is sprinkled over the seed in a suitable manner. As a result, the seed is germinated such that bean sprouts are grown up. Under the present circumstances, a large amount of bean spouts are piled up into several layers in the growing container. Upper layers of bean sprouts are gradually raised up by the lower layers of bean sprouts with growth of the latter layers. Bean sprouts grow up to have a length (6 to 8 cm) suitable to be eaten in about five to eight days after germination. At this stage of growth, the bean sprouts are taken out of the growing container and washed in water. The bean sprouts are then packed or bagged by a predetermined amount and shipped or transported to supermarkets and the like.

The bean sprouts sold as described above retain roots and leaves, which degrade an appearance of bean sprouts and diminish our appetite. Accordingly, roots and leaves are severed from bean sprouts with a kitchen knife in the Chinese cooking so that the bean sprouts including only sprouts are used in the Chinese cooking. Roots and leaves are conventionally severed with a kitchen knife manually. However, a severing work is time-consuming and troublesome.

In view of the foregoing problem, the prior art has proposed a method of obtaining bean sprouts including only sprouts. In the proposed method, as in a method of growing fresh radish sprout, a growing mat is used so that locations of roots are made uniform. Sprouts of a number of bean sprouts having grown thick on the growing mat are gripped by hand so that leaves of the bean sprouts are collectively severed with a kitchen knife, and the growing mat on which roots of the bean sprouts have grown thick is also severed, during harvest or cooking, whereby roots of all the bean sprouts are collectively severed.

In the foregoing method, however, the roots and leaves need to be manually severed with a knife. Thus, the problem of troublesome severing work with the kitchen knife cannot completely be solved. Moreover, the growing method in which the growing mat etc. is used to make the locations of roots uniform has a lower productivity and necessitates higher production cost as compared with a conventional growing method in which the bean sprouts are stacked into layers in the growing container. Furthermore, the sprout of the bean sprout become thinner such that the appearance of the bean sprout is degraded or the bean sprout is less appetizing.

SUMMARY OF THE INVENTION

Therefore, an object of the present invention is to provide a method and apparatus for severing roots and leaves of bean sprouts, which method and apparatus can automate a work for severing roots and leaves of bean sprouts mass-produced in a growing method similar to the conventional method.

To achieve the object, the present invention provides a method of severing roots and leaves of bean sprouts, comprising the step of disposing a cylindrical case on a severing table having a number of severing slits each of which has such a width that a root and leaf of a bean sprout are allowed to fall thereinto. The cylindrical case encloses bean sprouts in a standing state. The roots may be located higher or lower than the leaves and vice versa. When water is sprinkled or air is caused to blow from over the cylindrical case, the water or air flows downward in the cylindrical case, further flowing downward through the severing slit. As the result of such flow of water or air, the root or leaf of the bean sprout in the cylindrical case fall into the severing slit. A first severing work is carried out in which the roots or leaves fallen into the severing slit are severed. Thereafter, the cylindrical case is inverted upside down so that the bean sprouts in the cylindrical case are inverted upside down. A second severing work is carried out in which the downward roots or leaves of the bean sprouts are severed in the same manner as in the first severing work. Consequently, the roots and leaves severing work can be automated while the damage to the bean sprouts can be reduced as much as possible. Moreover, since the roots and leaves need not positionally correspond with each other, bean sprouts mass-produced in a growing method similar to the conventional method and having thick sprouts can be used, and bean sprouts which have a good appearance and are appetizing can be produced at low costs.

Either cylindrical case or severing table may be moved. In a preferred form, the cylindrical case has a lower edge and the severing slit has an edge, and the cylindrical case is moved along an upper face of the severing table so that the roots and leaves of the bean sprouts fallen in the severing slit are held between the lower edge of the cylindrical case and the edge of the severing table thereby to be severed. Since the lower edge of the cylindrical case serves as a cutter blade, no separate cutter blade is required. Consequently, since a severing structure is simplified, the equipment cost can be reduced. Moreover, the movement of the cylindrical case can result in continuous and efficient severing of the roots and leaves of the bean sprouts and conveyance of bean sprouts.

When the edge (corresponding to a cutter blade) of the cylindrical case is parallel with the severing slit, the roots of the bean sprouts need to be simultaneously held between the lower edge of the cylindrical case and the edge of the severing table thereby to be severed. In this case, a load applied to a drive motor for the cylindrical case in the severing is increased. Accordingly, a driving force of the drive motor needs to be increased. This would, however, result in an increase in the size of the drive motor and an increase in the electric power consumption.

As a countermeasure, for example, the edge of the severing slit or the edge of the cylindrical case may be inclined relative to a moving direction of the cylindrical case. Alternatively, the edge of the severing slit or the edge of the cylindrical case may be formed zigzag such that the severing slits and the edges of the cylindrical cases are located diagonally relative to each other. Accordingly, when passing the severing slit, each edge of the cylindrical case diagonally intersects the edge of the severing slit, and a point of intersection moves along the edge of the severing slit with movement of the cylindrical cases. As a result, since the roots and leaves in the severing slit are gradually severed, they can easily be severed and the driving force of the drive motor for the cylindrical case can be rendered smaller. Consequently, the size of the drive motor can be reduced, and the electric power consumption can be reduced.

In another preferred form, the cylindrical case has an opening with dimensions smaller than a length of the bean sprout, and the bean sprouts conveyed on a conveyor are caused to fall into the cylindrical case so that the bean sprouts are enclosed in the standing state in the cylindrical case. In other words, when the dimensions of the opening of the cylindrical case are smaller than the length of the bean sprout, the bean sprouts falling from the conveyor into the cylindrical case is prevented from lying sideways in the cylindrical case, so that the bean sprouts are enclosed in the cylindrical case with either the root or the leaf standing. Consequently, the work for enclosing the bean sprouts in the cylindrical case can be automated.

In further another preferred form, the conveyor comprises a vibrating or oscillating conveyor conveying the bean sprouts by means of vibration or oscillation, although a belt conveyor is used. When the bean sprouts form a large mass on the belt conveyor, there is a possibility that the large mass may fall into the cylindrical case and close the upper opening of the case. As a result, the bean sprouts may not be enclosed in the standing state in the cylindrical case. Accordingly, when the bean sprouts are conveyed on the belt conveyor, a small amount of the bean sprouts needs to be spread over the belt conveyor so as to be prevented from forming into a large mass.

On the other hand, when a vibrating or oscillating conveyor is used and the bean sprouts supplied onto the vibrating or oscillating conveyor form a large mass, the mass can be taken to pieces during conveyance by the vibration caused by the vibrating conveyor. Accordingly, the bean sprouts can be prevented from falling in masses from the supplying conveyor into the cylindrical cases and caused to continuously fall into the cylindrical case bit by bit. Consequently, the bean sprouts can easily be enclosed in the standing state in the cylindrical case.

In further another preferred form, two severing tables are disposed above and below, and a number of the cylindrical cases are connected into a belt shape and driven to be moved along upper sides of the upper and lower severing tables. Furthermore, the cylindrical cases are moved from an end of the upper severing table toward an end of the lower severing table so as to make a generally semicircular trajectory so that the cylindrical cases are inverted upside down, and two drop preventing covers are provided along outer and inner circumferential sides of the semicircular trajectory respectively, the drop preventing covers preventing the bean sprout from dropping out of the cylindrical case. Consequently, a sequence of the first severing, the upside-down inverting of cylindrical case, and the second severing can be carried out continuously and smoothly by the rotation of an apparatus comprising a number of the cylindrical cases connected into a general belt shape. Further, the apparatus can be rendered smaller since the two severing tables are disposed above and below.

The severing table may be made by forming severing slits in a metal plate by means of punching. Alternatively, the severing table may comprise a number of bar-shaped members formed with respective edges for severing the roots and leaves of the bean sprouts. In this case, the bar-shaped members are arranged in parallel with one another with a clearance between each bar-shaped member and an adjacent bar-shaped member, the clearance having a width allowing the roots and leaves of the bean sprouts to fall thereinto and serving as the severing slits. Consequently, the width between each bar-shaped member and the adjacent one can be adjusted according to the type or size of the bean sprouts, whereby the clearance between the bar-shaped members can easily be adjusted.

DETAILED DESCRIPTION OF THE EMBODIMENTS

Figure 1:
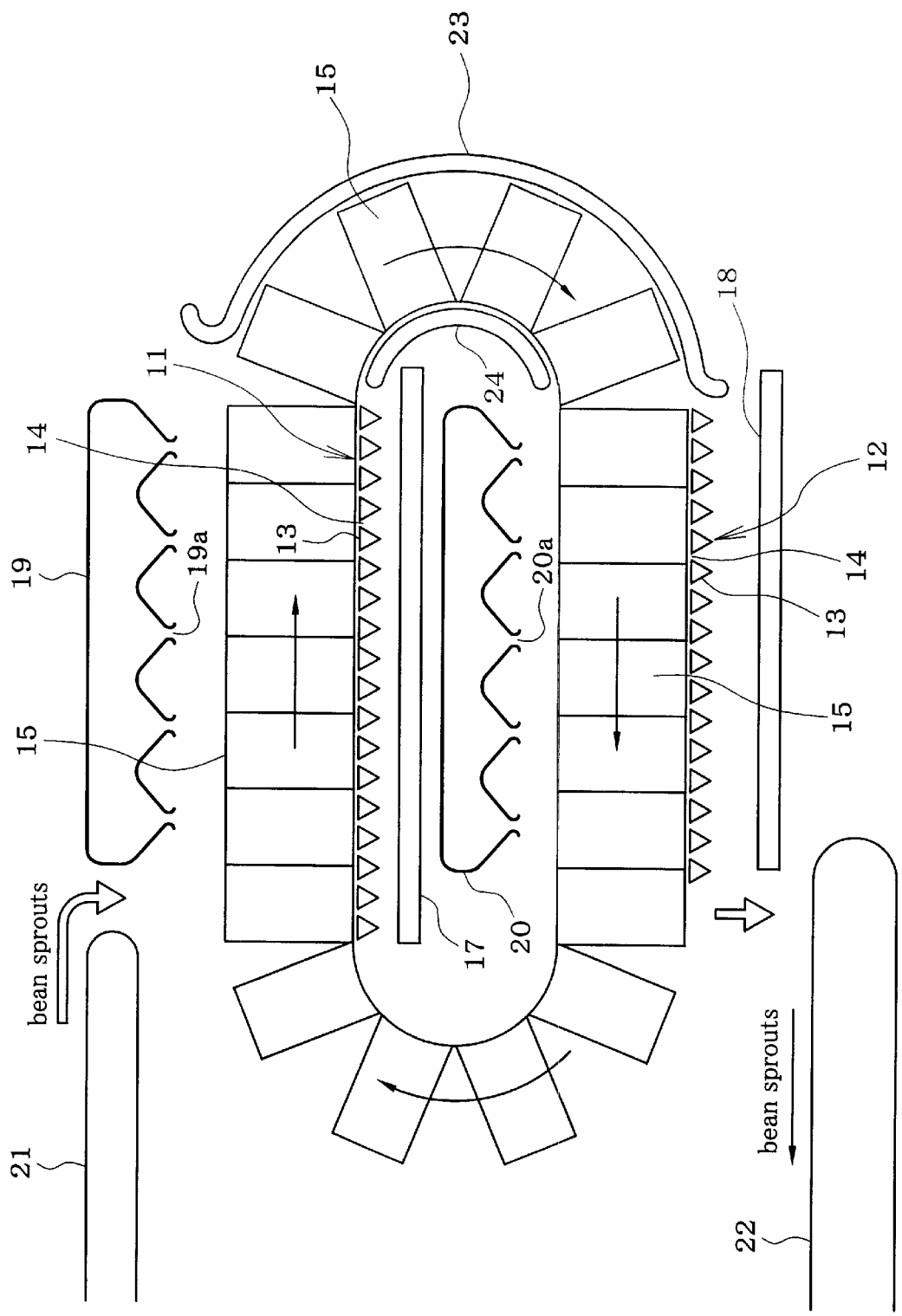
FIG. 1 is a front view of a root and leaf severing apparatus of one embodiment in accordance with the present invention.
Figure 4:
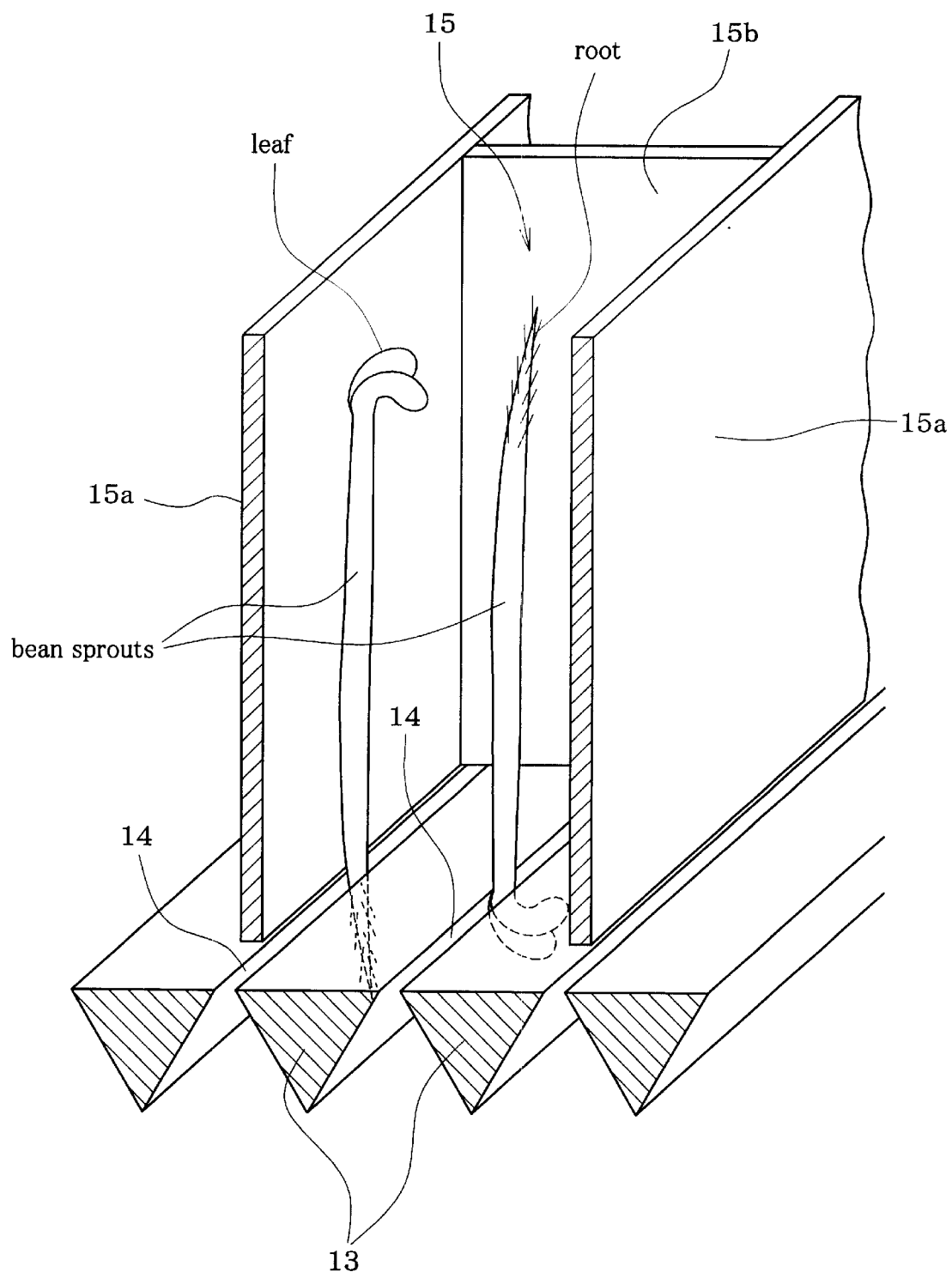
FIG. 4 is a perspective view of bar-shaped members and a cylindrical case, showing a case where the root and leaf of the bean sprouts are severed.

One embodiment of the present invention will be described with reference to the accompanying drawings. Referring to FIG. 1, an overall construction of an apparatus for severing roots and leaves of bean sprouts will be described. Two severing tables 11 and 12 are disposed above and below. Each severing table 11 or 12 comprises a number of bar-shaped members 13 arranged in parallel with one another with a predetermined clearance between each bar-shaped member and an adjacent one. Each bar-shaped member 13 has a generally triangular section and is secured so that one of three corners thereof is directed downward and the other two corners are directed horizontally. The corners of each bar-shaped member 13 are formed to serve as respective edges for severing roots and leaves of bean sprouts. A severing slit 14 is defined between one horizontal edge of each bar-shaped member 13 and one horizontal edge of the adjacent bar-shaped member 13 as best shown in FIG. 4. Each severing slit 14 has a width allowing the root and the leaf of the bean sprout to fall thereinto, as shown in FIG. 4. More specifically, each width may be set in a range of approximately one half to two-thirds of a thickness of the sprout of bean sprouts. For example, when the sprout is about 4 mm thick, the width of each severing slit 14 is set in a range of 2 to 2.7 mm.

Figure 2:
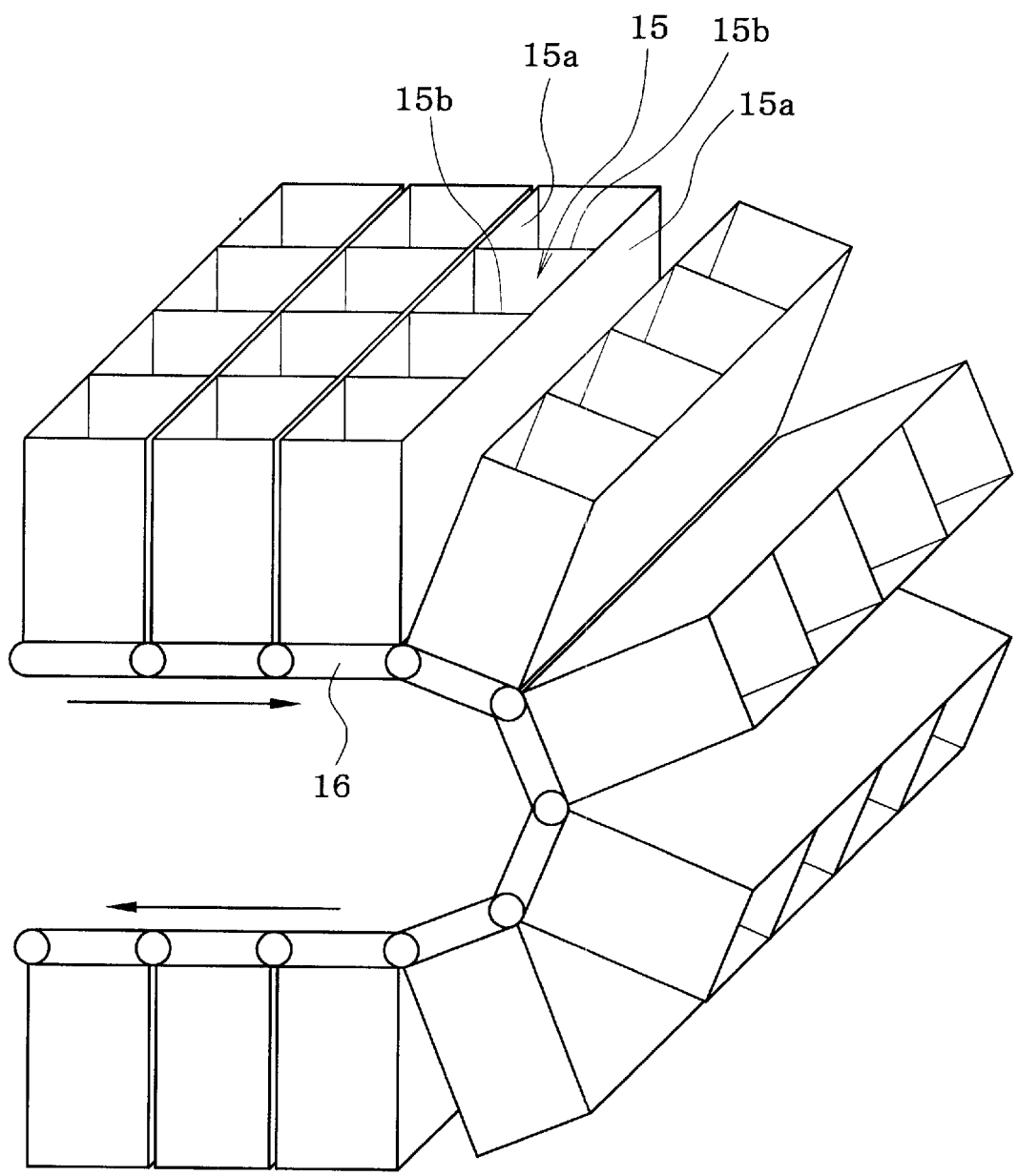
FIG. 2 is a partial perspective view of a combination of cylindrical cases.
Figure 3:
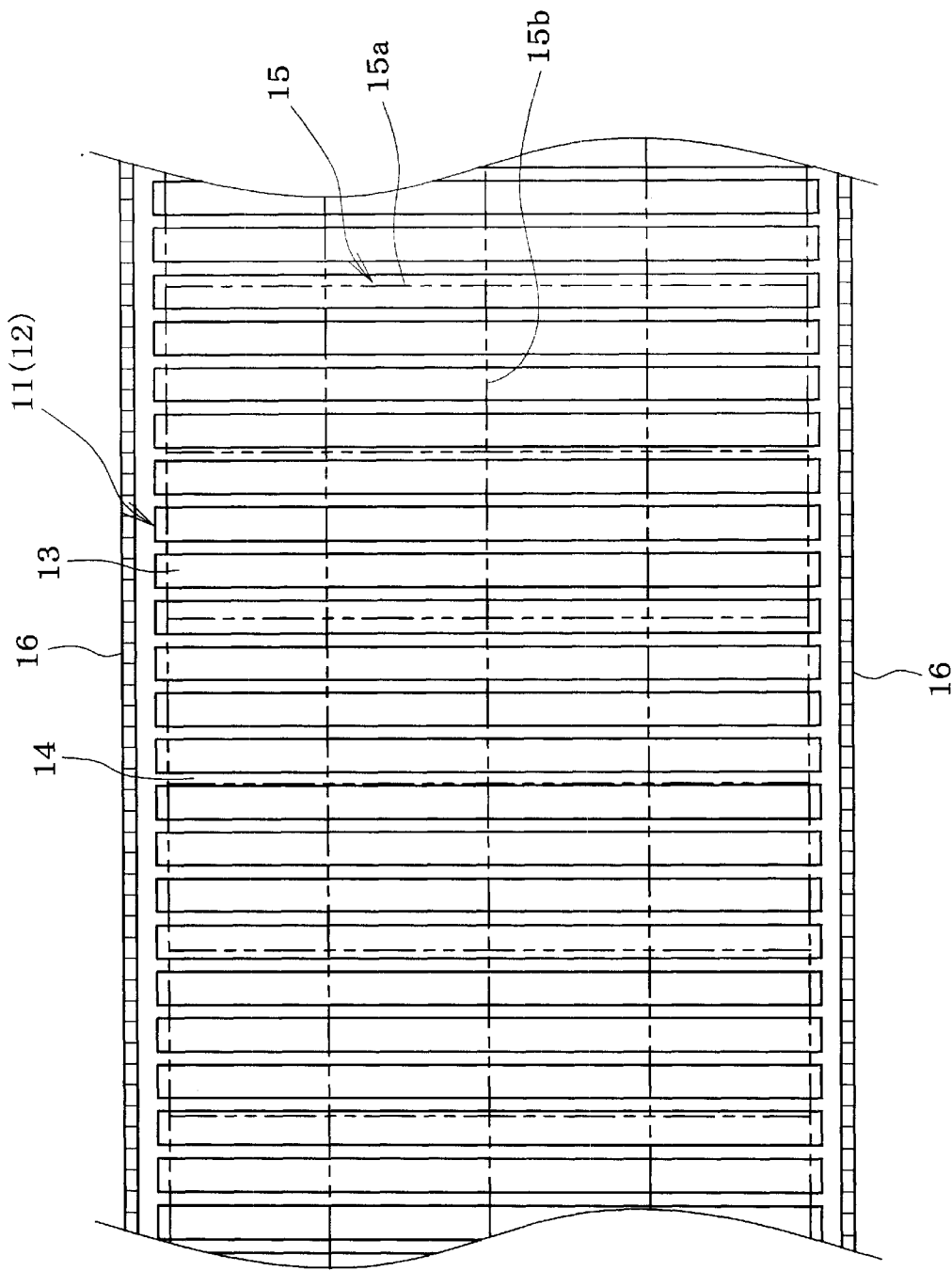
FIG. 3 is a partial plan view of the severing table.

A number of cylindrical cases 15 are arranged on each of the upper and lower severing tables 11 and 12. Each cylindrical case 15 is moved along upper sides of the severing tables 11 and 12 in the directions as shown by arrows in FIG. 1. Each row includes a plurality of cylindrical cases 15 (four in the embodiment) arranged perpendicularly to the direction in which the cylindrical cases 15 are moved, as shown in FIG. 2. Four cylindrical cases 15 of each row are integrated into a unit so as to be moved and inverted upside down together. Alternatively, four separately formed cylindrical cases 15 may be secured to one another in each row. In the embodiment, however, a plurality of partition plates 15b are disposed at regular intervals between two metal plates 15a each having a length substantially equal to the length of each bar-shaped member 13, so that the four cylindrical cases 15 are integrated into the unit.

Each cylindrical case 15 has an opening at one end having a length and a width both of which are set to be smaller than a length of the bean sprout. The bean sprouts located above the cylindrical cases 15 are caused to fall into the cylindrical cases so as to be enclosed naturally in a standing state in the cylindrical cases, as shown in FIG. 4. Thus, when the dimensions of the opening of each cylindrical case 15 are set to be smaller than the length of the bean sprout, the bean sprout enclosed in each cylindrical case 15 is prevented from lying sideways. As a result, the bean sprouts can be enclosed naturally in the standing state in each cylindrical case 15 with either roots or leaves thereof being directed downward.

Each cylindrical case 15 has a height substantially equal to or slightly larger than the length of the bean sprout. For example, when the length of the bean sprout ranges from 6 to 8 cm, the height of each cylindrical case 15 is set in a range of 8 to 10 cm and each of the length and width of the opening of each cylindrical case is set in a range of 4 to 5 cm.

Each cylindrical case 15 includes left and right side plates (metal plates 15a) each of which has upper and lower edges by which the roots and leaves of the bean sprouts enclosed in the cylindrical cases can be severed. A number of units of the cylindrical cases 15 are arranged almost without gap therebetween relative to the movement direction and then connected to one another by connecting members 16 into a belt shape as shown in FIG. 2. The units connected as described above are turned by an electric motor (drive means) as by a belt conveyor so that the cylindrical cases 15 are moved along the upper sides of the severing tables 11 and 12 in the directions as shown by arrows in FIG. 1. Accordingly, after moved along the upper side of the upper severing table 11, the cylindrical cases 15 are further moved from the right-hand end of the upper severing table 11 toward the right-hand end of the lower severing table 12 along a curved path so as to make a generally semicircular trajectory. As a result, the cylindrical cases 15 are inverted upside down such that the bean sprouts in the cases are accordingly inverted upside down, as viewed in FIGS. 1 and 2. Two drop preventing covers 23 and 24 (drop preventing means) are provided outside and inside the semicircular trajectory of the cylindrical cases 15 respectively. The drop preventing covers 23 and 24 prevent the bean sprouts from dropping out of the cylindrical cases 15.

Each cylindrical case 15 is moved along the upper side of each severing table 11 or 12 while the lower edges thereof are in a slight touch with the upper faces of the bar:shaped members 13 or while a slight clearance is defined between the lower edges of each cylindrical case 15 and the upper faces of the bar-shaped members 13. Roots or leaves having fallen in the severing slit 14 between the bar-shaped members 13 are held between the lower edge of the cylindrical case 15 and the edge of the severing slit 14 to thereby be severed, as shown in FIG. 4. Two discharging apparatuses 17 and 18 are provided below the respective severing tables 11 and 12 for receiving and discharging roots and leaves severed. Each discharging apparatus 17 and 18 may comprise a chute which causes the roots and leaves severed to slide on an inclined face or a conveyor.

Two blower casings 19 and 20 are provided over the upper and lower severing tables 11 and 12 respectively. The blower casings 19 and 20 serve as blowing means and connected to discharge openings of a blower (not shown). The blower casings 19 and 20 have a plurality of supply openings 19a and 20a formed in the undersides thereof respectively. Air is caused to blow from the supply openings 19a and 20a into the cylindrical cases 15 located on the severing tables 11 and 12 respectively. The above-described manner of supplying air into the cylindrical cases 15 may be changed. For example, a plurality of blowers may be provided over each of the severing tables 11 and 12 so as to supply air into the cylindrical cases 15.

A conveyor 21 is provided above the left-hand end of the upper severing table 11 for supplying bean sprouts into the cylindrical cases 15, as viewed in FIG. 1. The conveyor 21 comprises a vibrating or oscillating conveyor conveying bean sprouts by means of vibration or oscillation. Accordingly, even when the bean sprouts are supplied in a mass onto the conveyor 21, the mass of bean sprouts is gradually taken to pieces by the vibration or oscillation caused by the conveyor 21 during conveyance. A conveying surface (upper face) of the conveyor 21 is a simple flat surface in the embodiment. Alternatively, however, the conveying surface may be corrugated so that a ridge and bottom of each corrugation extend in a conveying direction of the conveyor 21. Consequently, when conveyed on the conveyor 21, the bean sprouts are re-arranged so as to be directed in the conveying direction by the corrugated conveying surface of the conveyor 21. Accordingly, the bean sprouts are caused to fall from the conveyor 21 into the cylindrical cases 15 with their roots and leaves being directed downward. As a result, the bean sprouts can more easily be enclosed in a standing state in the cylindrical cases 15.

A receiving conveyor 22 is provided below the left-hand end of the lower severing table 12. The conveyor 22 receives bean sprouts including only sprouts scraped away from the left-hand end of the lower severing table 12 with the movement of the cylindrical cases 15. The conveyor 22 further conveys the bean sprouts including only sprouts.

The connected assemblies of the cylindrical cases 15 are turned as a belt conveyor during operation of the above-described severing apparatus. As a result, a number of cylindrical cases 15 are moved along the upper sides of the severing tables 11 and 12 in the directions as shown by the respective arrows in FIG. 1, and the cylindrical cases 15 moved along the upper side of the severing table 11 rightward are further moved from the right-hand end of the upper severing table 11 toward the right-hand end of the lower severing table 12 along the curved path so as to make a semicircular trajectory, whereby the cylindrical cases 15 are inverted upside down.

The blower (not shown) is then operated so that washed bean sprouts are continuously conveyed on the vibrating or oscillating conveyor 21 into the cylindrical cases 15 on the upper severing table 11 while air supplied from the supply openings 19a and 20a of the blower casings 19 and 20 is caused to blow against the interiors of substantially all the cylindrical cases 15 located on the respective severing tables 11 and 12. The conveyor 21 conveys the bean sprouts by means of vibration or oscillation. Accordingly, even when the bean sprouts are supplied onto the conveyor 21 in a mass, the mass can gradually be taken to pieces and spread when conveyed on the conveyor 21. Consequently, the bean sprouts can be prevented from falling in masses from the supplying conveyor 21 into the cylindrical cases 15 and caused to fall into the cylindrical cases 15 continuously little by little.

The length and width of the opening of each cylindrical case 15 are set to be smaller than the length of the bean sprout. Accordingly, when the bean sprouts are caused to fall from the conveyor 21 disposed above the cylindrical cases 15 into the cases little by little, the bean sprouts are enclosed in each cylindrical case 15 naturally in the standing state.

Air supplied from the supply openings 19a and 20a of the blower casings 19 and 20 is caused to blow against the interiors of the cylindrical cases 15 located on the respective severing tables 11 and 12. The air then blows downward through the severing slits 14 between the bar-shaped members 13 of each severing table 11 or 12. Accordingly, the roots and leaves of the bean sprouts enclosed in the cylindrical cases 15 in the standing state are caused to flow into the severing slits 14 by the air flowing into the severing slits 14. The roots and leaves of the bean sprouts having fallen in the severing slits 14 are held between the lower edges of the cylindrical cases 15 and the edges of the severing slits 14 to be severed. Furthermore, air pressure blows away water adherent to the bean sprouts downward from the severing slits 14, whereby the bean sprouts are dewatered. Consequently, the severing of roots and leaves and the dewatering can efficiently be carried out simultaneously while the damage to the bean sprouts can be reduced as much as possible.

The bean sprouts from which the roots and leaves have been severed on the upper severing table 11 are conveyed rightward on the upper severing table 11 with movement of the cylindrical cases 15, as viewed in FIG. 1. From the right-hand end of the severing table 11, the cylindrical cases 15 are moved toward the right-hand end of the lower severing table 12 so as to make the semicircular trajectory. As a result, the cylindrical cases 15 and accordingly the bean sprouts enclosed therein are inverted upside down. In this state, the cylindrical cases 15 are conveyed leftward along the upper face of the lower severing table 12. In course of the movement, the roots and leaves of the bean sprouts fall into the severing slits 14 of the severing table 12 thereby to be severed.

Both roots and leaves of the bean sprouts are thus severed, and the bean sprouts including only sprouts are obtained. The bean sprouts including only sprouts are conveyed leftward along the lower severing table 12 with the movement of the cylindrical cases 15, as viewed in FIG. 1. As the result of the movement, the bean sprouts with only sprouts are scraped away downward from the left-hand end of the lower severing table 12 onto the receiving conveyor 22, which conveys the bean sprouts with only sprouts to a next step such as a bagging or packing step, as viewed in FIG. 1. The cylindrical cases 15 serve to carry out the bean sprouts from the severing tables 11 and 12 after the severing as well as to sever the roots and leaves of the bean sprouts. Accordingly, the severing of the roots and leaves, dewatering and takeout of the bean sprouts can efficiently be carried out continuously by the movement of the cylindrical cases 15 even when the air pressure is increased for improvement of dewatering performance.

According to the foregoing embodiment, the bean sprouts are enclosed in the standing state in the cylindrical cases 15 which are being moved on the upper severing table 11. Air is caused to blow into the interiors of the cylindrical cases 15 from over the cases so that the downwardly directed roots and leaves of the bean sprouts in the cylindrical cases 15 fall into the severing slits 14 of the upper severing table 11. The roots and leaves of the bean sprouts are held between the lower edges of the cylindrical cases 15 and the edges of the severing slits 14 thereby to be severed. Thus, the first severing work is carried out. Thereafter, the cylindrical cases 15 and accordingly the bean sprouts in the cases are inverted upside down, and the downwardly directed roots and leaves are severed by the lower severing table 12 in the manner similar to the first severing work. Consequently, the root and leaf severing work can be automated while the damage to the bean sprouts can be reduced as much as possible. Moreover, since the roots and leaves need not positionally correspond with each other, bean sprouts mass-produced in a growing method similar to the conventional method and having thick sprouts can be used, and bean sprouts which have a good appearance and are appetizing can be produced at low costs.

Furthermore, when air is caused to blow into the interiors of the cylindrical cases 15 on each of the severing tables 11 and 12 from over the cases, the downwardly directed roots and leaves of the bean sprouts in the cylindrical cases 15 can be caused to fall into the severing slits 14 and simultaneously, the bean sprouts can be dewatered. Consequently, a separate dewatering step is advantageously unnecessary. However, sprinkling means such as a shower system may be provided for sprinkling water from over the cylindrical cases 15 on each of the severing tables 11 and 12, so that the roots and leaves of the bean sprouts are caused to flow into the severing slits 14, instead. In this case, too, the roots and leaves can reliably be severed from the bean sprouts.

The cylindrical cases 15 are moved only in the predetermined directions (in the directions of arrows in FIG. 1) in the foregoing embodiment. However, the cylindrical cases 15 may be moved forward a predetermined distance and backward another predetermined distance alternately repeatedly. In this case, the distance of backward movement is set to be shorter than the distance of forward movement. When the cylindrical cases 15 repeat a forward movement and a backward movement alternately, bean sprouts entangled are disentangled, whereupon the roots and leaves of the bean sprouts can easily be caused to fall into the severing slits 14. At the same time, the roots and leaves of the bean sprouts are severed in the forward movement by the edges of the cylindrical cases 15 differing from those in the backward movement. Consequently, the roots and leaves of the bean sprouts can easily be severed. In this case, the distance of forward movement and the distance of backward movement of the cylindrical cases 15 may be in the ratio of 2:1, 3:1 or 4:1.

The severing slits 14 of the severing tables 11 and 12 are in parallel with the edges of the cylindrical cases 15 in the foregoing embodiment. Accordingly, all the roots of the bean sprouts in the severing slits 14 need to be simultaneously severed by the edges of the cylindrical cases 15. As a result, load is increased during the severing of the roots. The increase in the load also increases the driving force of an electric motor driving the cylindrical cases 15. This results in an increase in the size and electric power consumption of the motor.

As a countermeasure, for example, the severing slits 14 or the edges of the cylindrical cases 15 may be inclined relative to the direction in which the cylindrical cases 15 are moved. Alternatively, the severing slits 14 or the edges of the cylindrical cases 15 may be formed zigzag such that the severing slits 14 and the edges of the cylindrical cases 15 are located diagonally relative to each other. Accordingly, when passing the severing slit 14, each edge of the cylindrical case 15 diagonally intersects the edge of the severing slit 14, and a point of intersection moves along the edge of the severing slit 14 with movement of the cylindrical cases 15. As a result, since the roots and leaves in the severing slit are gradually severed, they can easily be severed and the driving force of the drive motor for the cylindrical cases can be rendered smaller. Consequently, the size and the electric power consumption of the drive motor can be reduced.

Each of the severing tables 11 and 12 may be made by forming severing slits in a metal plate by means of punching. Alternatively, each severing table 11 or 12 may comprise a number of the bar-shaped members 13 formed with the respective edges for severing the roots and leaves of the bean sprouts. In this case, the bar-shaped members 13 are arranged in parallel with one another with a width between each bar-shaped member 13 and an adjacent bar-shaped member, the width allowing the roots and the leaves of the bean sprouts to fall thereinto and serving as the severing slits. Consequently, the width between each bar-shaped member 13 and the adjacent one can be adjusted according to the type or size of the bean sprouts, whereby the width between the bar-shaped members 13 can easily be adjusted. In this case, the section of each bar-shaped member 13 should not be limited to the triangular shape. Each bar-shaped member 13 may have a section of any shape that allows corners of each bar-shaped member 13 to serve as respective edges.

The edges of each cylindrical case 15 serve as cutter blades in the foregoing embodiment. Accordingly, since separate cutter blades need not be provided, the construction of the severing apparatus can be simplified, and the equipment cost can be reduced. However, cutter blades may be mounted to the upper and lower ends of each cylindrical case 15, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A method of severing roots and leaves of bean sprouts, comprising the steps of:

disposing a cylindrical case on a severing table having a number of severing slits each of which has such a width that a root and leaf of a bean sprout are allowed to fall thereinto, the cylindrical case enclosing bean sprouts in a standing state;

sprinkling water or causing air to blow from over the cylindrical case so that the downward roots and leaves of the bean sprouts in the cylindrical case fall into the severing slit, and carrying out a first severing work in which the roots and leaves of the bean sprouts are severed; and inverting the cylindrical case upside down thereafter so that the bean sprouts in the cylindrical case are inverted upside down, and carrying out a second severing work in which the downward roots and leaves of the bean sprouts are severed in a manner similar to a manner in the first severing work.

2. The method according to claim 1, wherein the cylindrical case has at least one lower edge and the severing slit has an edge, and the cylindrical case is moved along an upper side of the severing table so that the roots and leaves of the bean sprouts fallen in the severing slit are held between the lower edge of the cylindrical case and the edge of the severing table thereby to be severed.

3. The method according to claim 2, wherein the edges of the cylindrical case and the severing slit diagonally intersect when the roots and leaves of the bean sprouts are held between the edges of the cylindrical case and the severing table to be severed.

4. The method according to claim 1, wherein the cylindrical case has an opening with dimensions smaller than a length of the bean sprout, and the bean sprouts conveyed on a conveyor are caused to fall into the cylindrical case so that the bean sprouts are enclosed in the standing state in the cylindrical case.

5. The method according to claim 4, wherein the conveyor comprises a vibrating or oscillating conveyor conveying the bean sprouts by means of vibration or oscillation.

6. The method according to claim 1, wherein two severing tables are disposed above and below, wherein a number of the cylindrical cases are connected into a belt shape and driven to be moved along upper sides of the upper and lower severing tables, wherein the cylindrical cases are moved from an end of the upper severing table toward an end of the lower severing table so as to make a generally semicircular trajectory so that the cylindrical cases are inverted upside down, and wherein two drop preventing covers are provided along outer and inner circumferential sides of the semicircular trajectory respectively, the drop preventing covers preventing the bean sprouts from dropping out of the cylindrical cases.

7. The method according to claim 1, wherein the severing table comprises a number of bar-shaped members formed with respective edges for severing the roots and leaves of the bean sprouts, the bar-shaped members being arranged in parallel with one another with a clearance between each bar-shaped member and an adjacent bar-shaped member, the clearance having a width allowing the roots and leaves of the bean sprouts to fall into the clearance and serving as the severing slit.

8. An apparatus for severing roots and leaves of bean sprouts, comprising:

a severing table having a number of severing slits each of which has such a width that a root and leaf of a bean sprout are allowed to fall thereinto;

a cylindrical case enclosing bean sprouts in a standing state;

a conveyor for supplying the bean sprouts from over the cylindrical case;

means for sprinkling water or causing air to blow from over the cylindrical case so that downward roots or leaves of the bean sprouts in the cylindrical case are caused to fall into the severing slit;

drive means for carrying out a first severing work in which the cylindrical case is moved along an upper side of the severing table so that the roots and leaves of the bean sprouts fallen in the severing slit are severed, the drive means being thereafter inverted upside down so that the bean sprouts in the cylindrical case are inverted upside down, carrying out a second severing work in which the downward roots and leaves of the bean sprouts are severed; and drop preventing means for preventing the bean sprouts from dropping out of the cylindrical cases.

9. The apparatus according to claim 8, wherein:

two severing tables are disposed above and below;

a number of the cylindrical cases are connected into a belt shape and driven to be moved along upper sides of the upper and lower severing tables; and the cylindrical cases are moved from an end of the upper severing table toward an end of the lower severing table so as to make a generally semicircular trajectory so that the cylindrical cases are inverted upside down.

* * * * *